United States Patent
Tanida (10) Patent No.: US 10,568,456 B2
(45) Date of Patent: Feb. 25, 2020

(54) BEVERAGE SUPPLY DEVICE

(71) Applicant: FUJI ELECTRIC CO., LTD., Kawasaki-shi (JP)

(72) Inventor: Yoshika Tanida, Minami-Awaji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 299 days.

(21) Appl. No.: 15/205,522

(22) Filed: Jul. 8, 2016

(65) Prior Publication Data
US 2017/0035240 A1 Feb. 9, 2017

(30) Foreign Application Priority Data
Aug. 5, 2015 (JP) .................................. 2015-155232

(51) Int. Cl.
  *A47J 31/46* (2006.01)
  *A47J 31/56* (2006.01)
  *A47J 31/54* (2006.01)

(52) U.S. Cl.
  CPC ............. *A47J 31/465* (2013.01); *A47J 31/54* (2013.01); *A47J 31/56* (2013.01)

(58) Field of Classification Search
  CPC .......... A47J 31/465; A47J 31/54; A47J 31/56
  USPC ........ 99/275, 279–301, 302 P, 323.1, 323.2, 99/323.3, 483, 485, 516, 536; 222/135, 222/129.3, 129.4, 146.1, 146.2, 146.3, 222/146.4, 146.5; 126/344, 345; 392/441, 450, 451, 458, 461, 479, 480
  See application file for complete search history.

(56) References Cited

U.S. PATENT DOCUMENTS

| | | | |
|---|---|---|---|
| 3,444,803 A * | 5/1969 | Karlen | A47J 31/00 99/285 |
| 5,678,734 A | 10/1997 | Walker | |
| 6,889,600 B2 * | 5/2005 | Rava | B67D 1/0004 222/146.1 |
| 2005/0126401 A1 * | 6/2005 | Streeter | A47J 31/32 99/279 |

(Continued)

FOREIGN PATENT DOCUMENTS

| | | |
|---|---|---|
| JP | H08-508177 A | 9/1996 |
| JP | 2010-063595 A | 3/2010 |
| WO | 2014/027310 A1 | 2/2014 |

OTHER PUBLICATIONS

China Patent Office, "Office Action for Chinese Patent Application No. 201610537805.9," dated Sep. 26, 2019.

*Primary Examiner* — Dana Ross
*Assistant Examiner* — Joseph W Iskra
(74) *Attorney, Agent, or Firm* — Manabu Kanesaka (57) ABSTRACT

A beverage supply device can suppress a decline of a temperature of hot water remaining in a hot-water delivery piping for guiding the hot water pumped up by a pump to a beverage extraction unit without increasing a cost. The beverage supply device with a hot-water tank storing the hot water heated by a built-in heater is provided with the hot-water delivery piping for guiding the hot water pumped up by the pump arranged below the hot-water tank to the beverage extraction unit. The hot-water delivery piping is arranged to pass through the hot-water tank so that the hot water remaining in the hot-water delivery piping during a stand-by time is kept warm at a temperature of the hot water inside the hot-water tank by the hot water inside the hot-water tank.

5 Claims, 3 Drawing Sheets

(56) References Cited

U.S. PATENT DOCUMENTS

2008/0028944 A1* 2/2008 Webster ............... A47J 31/057
  99/283
2015/0226452 A1 8/2015 Adobati et al.

* cited by examiner

BEVERAGE SUPPLY DEVICE

BACKGROUND OF THE INVENTION AND RELATED ART STATEMENT

The present invention relates to a beverage supply device mounting a hot-water tank storing hot water heated by a built-in heater to provide a prepared (extracted) beverage using the hot water stored in the hot-water tank as needed.

In a cup-type automatic vending machine with a type mixing a material inside a cup, which is well-known as the beverage supply device mounting the hot-water tank storing the hot water heated by the built-in heater to provide the prepared beverage using the hot water stored in the hot-water tank as needed, a plurality of canisters housing powdery raw materials such as instant coffee, sugar, cream, and the like is mounted inside a main member of the automatic vending machine, and a fixed amount of powdery raw materials is supplied to a cup from a corresponding canister according to a sales order of a selected beverage, and after the hot water supplied from the hot-water tank is added and stirred, the aforementioned cup is carried to a sales port for sale. In the aforementioned cup-type automatic vending machine serving for a sale of regular coffee, there is provided a coffee brewer extracting a regular coffee beverage by the hot water supplied from the hot-water tank to ground beans crushed by a mill after coffee beans supplied from a coffee bean canister housing roasted coffee beans are crushed by the mill to the ground beans with a specified particle size. This type of cup-type automatic vending machine is relatively tall, so that generally, the hot-water tank is disposed in an upper region of the main member of the automatic vending machine so that the hot water supplied from the hot-water tank falls by gravity. Then, the hot water stored in the hot-water tank is supplied to the cup through a hot-water delivery piping by controlling opening and closing of a hot-water valve which is a valve member discharging the hot water stored in the hot-water tank. In that case, a supply quantity (supply quantity per one sale) of the hot water is determined by a time when the hot-water valve opens, and the hot-water delivery piping connected to the hot-water valve is arranged in an up-and-down direction, and when the hot-water valve is closed, all of the hot water inside the hot-water delivery piping falls by gravity, so that the hot water never remains inside the hot-water delivery piping. Therefore, there are no possibilities such that as in the case wherein the hot water remains inside the hot-water delivery piping, the hot water with a lowered temperature is supplied at the time of the next sale, or if there is a long time until the next sale, the hot water remaining inside the hot-water delivery piping cools to generate bacteria.

With respect to such a tall cup-type automatic vending machine, there is also known a desktop-type beverage supply device having a small height and small size. The small-size beverage supply device is also provided with a raw-material supply unit including canisters housing raw materials; a beverage extraction unit spouting a content of the raw material by mixing the raw material supplied from the raw-material supply unit and the hot water, or soaking the raw material in the hot water to prepare a beverage; a hot-water tank storing the hot water heated by a built-in heater; and the like. Since this kind of small-sized beverage supply device has the small height, it is difficult to dispose the hot-water tank above the beverage extraction unit so as to be formed such that the raw-material supply unit and the beverage extraction unit are disposed close to a front side of a box-shaped cabinet, and the hot-water tank is arranged close to a rear side of an exterior case. In that case, there is arranged a pump for pumping up the hot water stored in the hot-water tank to send to the beverage extraction unit below the hot-water tank, and the hot water stored in the hot-water tank is pumped upward by the aforementioned pump (for example, see Patent Document 1).

The beverage supply device disclosed in the Patent Document 1 is formed such that the hot-water delivery piping for guiding the hot water pumped up by the pump arranged below the hot-water tank to the beverage extraction unit is laid in such a way as to pass outside the hot-water tank, and the hot-water valve composed of the valve member is provided in a middle of the hot-water delivery piping, and whenever a beverage is selected by a beverage selection device, the pump and the hot-water valve are controlled to deliver the hot water stored in the hot-water tank to the beverage extraction unit.

Patent Document 1: Japanese Unexamined Patent Application Publication No. 2010-63595

The aforementioned invention disclosed in the Patent Document 1 excels in that the beverage supply device can be made small and compact by disposing the hot-water tank at a rear side of the raw-material supply unit and the beverage extraction unit.

However, the beverage supply device disclosed in the Patent Document 1 is formed such that the hot-water delivery piping for guiding the hot water pumped up by the pump arranged below the hot-water tank to the beverage extraction unit is piped in such a way as to pass outside the hot-water tank, and the hot-water valve composed of an electromagnetic valve is provided in the middle of the hot-water delivery piping, and whenever the beverage is selected by the beverage selection device, the pump and the hot-water valve are controlled to deliver the hot water stored in the hot-water tank to the beverage extraction unit.

Accordingly, during a stand-by time when waiting for a selection of the beverage by the beverage selection device, the hot water remains in the hot-water delivery piping between the pump and the hot-water valve, and next, in a case wherein the beverage is selected, the hot water remaining in the hot-water delivery piping is delivered to the beverage extraction unit. The aforementioned hot-water delivery piping is placed in an ordinary temperature atmosphere, and the temperature of the hot water remaining in the hot-water delivery piping falls as time proceeds, so that as the stand-by time becomes longer, the hot water which became cold is likely to be delivered to the beverage extraction unit so as to have a problem that there is a possibility that when the hot water remaining inside the hot-water delivery piping is cooled, the bacteria is likely to be generated.

In order to solve the aforementioned problem, there can be considered to adopt a technology for a power-operated electric pot and the like, i.e. the hot-water delivery piping is made wherein after the hot-water delivery piping is made of glass with a silver vapor deposition in order to suppress a heat release, the hot-water delivery piping is tightly attached to an outer wall of a metal hot-water tank. However, even in a case wherein the hot-water delivery piping is made of a special-purpose article, a decline of the temperature of the hot water remaining in the hot-water delivery piping is inevitable so as to have a problem to be improved in terms of cost-effectiveness.

The present invention is made in view of the aforementioned problems, and an object of the present invention is to solve the aforementioned problems, and to provide a beverage supply device which can suppress the decline of the temperature of the hot water remaining in the hot-water delivery piping for guiding the hot water pumped up by the pump to the beverage extraction unit without increasing a cost.

Further objects and advantages of the invention will be apparent from the following description of the invention.

SUMMARY OF THE INVENTION

In order to obtain the aforementioned objects, the present invention according to the first aspect is a beverage supply device mounting a hot-water tank storing a hot water heated by a built-in heater to provide a beverage prepared using the hot water stored in the hot-water tank as needed, and comprises a hot-water delivery piping for guiding the hot water pumped up by a pump arranged below the hot-water tank and stored in the hot-water tank to a beverage extraction unit. The hot-water delivery piping passes through the hot-water tank.

Also, as for the invention according to a second aspect, in the beverage supply device according to the first aspect, the heater built in the hot-water tank is disposed to extend in an up-and-down direction, and the hot-water delivery piping passing through the hot-water tank is disposed close to the heater.

Also, as for the invention according to a third aspect, in the beverage supply device according to the second aspect, the heater is arranged double by bending in a U-shape inside the hot-water tank, and the hot-water delivery piping passing through the hot-water tank is disposed between the doubled heater.

According to the beverage supply device according to the first aspect of the present invention, the beverage supply device mounting the hot-water tank storing the hot water heated by the built-in heater to provide the beverage prepared using the hot water stored in the hot-water tank as needed, comprises the hot-water delivery piping for guiding the hot water pumped up by the pump arranged below the hot-water tank and stored in the hot-water tank to the beverage extraction unit. The hot-water delivery piping passes through the hot-water tank so as to control the pump by selecting a beverage by a beverage selection device, and during a stand-by time after the hot water stored in the hot-water tank is discharged to the beverage extraction unit through the hot-water delivery piping, a water surface of the hot water remaining in the hot-water delivery piping returns to a water level of the hot water stored in the hot-water tank, and the hot water remaining in the hot-water delivery piping is kept warm at a temperature of the hot water inside the hot-water tank by the hot water inside the hot-water tank, so that the hot water having a proper temperature can be delivered to the beverage extraction unit even at a time of the next beverage supply. Also, there is an effect that there is no possibility that the hot water remaining in the hot-water delivery piping becomes cold and generates bacteria.

Also, as for the beverage supply device according to the second aspect of the present invention, in the beverage supply device according to the first aspect, the heater built in the hot-water tank is disposed to extend in the up-and-down direction, and the hot-water delivery piping passing through the hot-water tank is disposed close to the heater, so that when the hot water inside the hot-water tank is heated by electrifying the heater during the stand-by time, the hot water remaining in the hot-water delivery piping can be stably maintained at a high temperature. In that case, as in a case of the beverage supply device according to the third aspect, the heater is arranged double by bending in the U-shape inside the hot-water tank, and the hot-water delivery piping passing through the hot-water tank is arranged between the doubled heater so as to maintain the hot water remaining in the hot-water delivery piping at the high temperature further.

BRIEF DESCRIPTION OF THE DRAWINGS

FIGS. 1(a) and 1(b) show a beverage supply device according to an embodiment of the present invention, wherein

FIGS. 2(a) and 2(b) show an overall structure of a hot-water tank in FIGS. 1(a) and 1(b), wherein

DETAILED DESCRIPTION OF PREFERRED EMBODIMENTS

Hereinafter, a beverage supply device according to an embodiment of the present invention will be explained in detail based on the drawings.

Figure 1A:
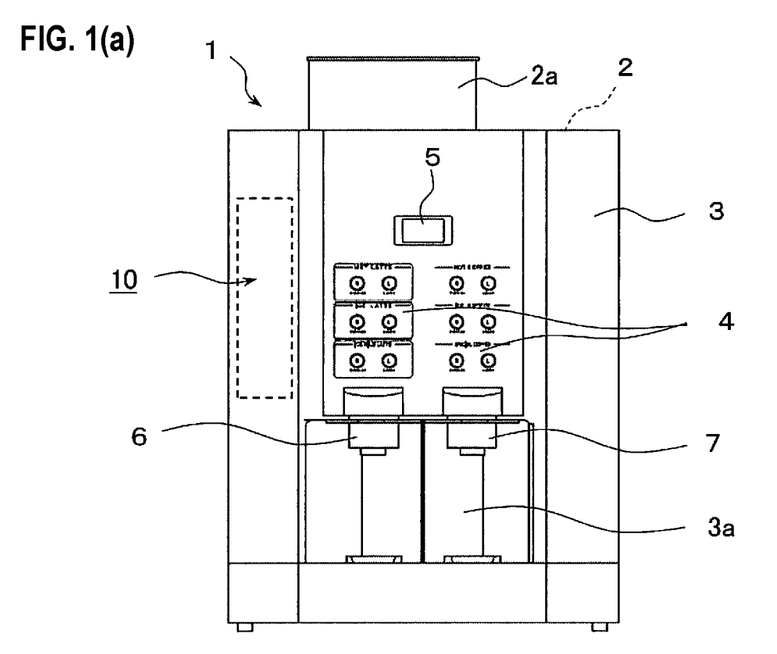
FIG. 1(a) is a front view.
Figure 1B:
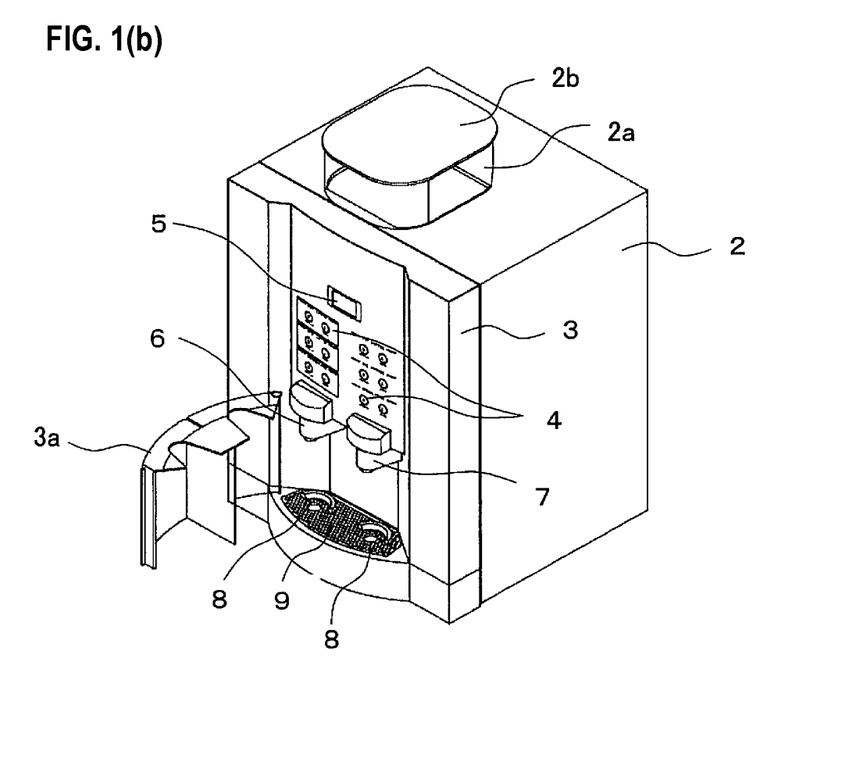
FIG. 1(b) is a perspective view seen obliquely from a right upper side in FIG. 1(a)

FIGS. 1(a) and 1(b) show an overall structure of a beverage supply device according to an embodiment of the present invention. As shown in the drawings, a beverage supply device 1 comprises a cabinet 2 formed as a housing including an opening at a front face; and a single-opening-type door 3 supported at one side of the front face of the cabinet 2 for closing the opening of the front face of the cabinet 2. In an upper area of the front face of the door 3, there are disposed beverage selection buttons 4, and a liquid crystal display portion 5. In a middle area of the door 3, there are disposed beverage supply nozzles 6 and 7 supplying a beverage prepared (extracted) inside the cabinet 2, and underneath thereof, there are provided cup rests 8 which become placing stands for a cup which is a beverage container; and a drip tray 9 collecting scattered beverages and the like. Also, in the door 3, there is provided a cover 3a made of synthetic resin to cover front areas of discharge port portions of the beverage supply nozzles 6 and 7, and the cup rests 8. In the cover 3a, one side thereof is axially supported on the door 3, and the cover 3a can turn between a closed position shown in FIG. 1(a) and an open position shown in FIG. 1(b).

In a top plate portion of the cabinet 2, there is provided a canister 2a made of synthetic resin (colorless and transparent) housing a material for generating a beverage. The canister 2a is disposed such that a head portion protrudes upward from the top plate portion of the cabinet 2, and in the head portion, there is provided an opening/closing lid 2b. In the canister 2a, there are housed coffee beans roasted with charcoal fire, and the roasted coffee beans are replenished by opening and closing the opening/closing lid 2b. At a lower side of the canister 2a inside the cabinet 2, there are disposed a bean chute, a mill, and a coffee brewer, which are not shown in the drawings. The bean chute guides coffee beans supplied from the canister 2a to the mill, and the mill grinds the coffee beans supplied from the canister 2a through the bean chute into ground beans having a specified particle size by a crushing blade. The coffee brewer prepares (extracts) a regular coffee beverage by the ground beans ground by the mill with hot water supplied from the later-described hot-water tank 10 according to the present invention. The regular coffee beverage prepared (extracted) by the coffee brewer is pipe-connected to supply to the beverage supply nozzle 6. The coffee brewer forms a beverage extraction unit 21, and is disposed close to a front side of an approximately center portion in a right-and-left direction of the cabinet 2.

Figure 2A:
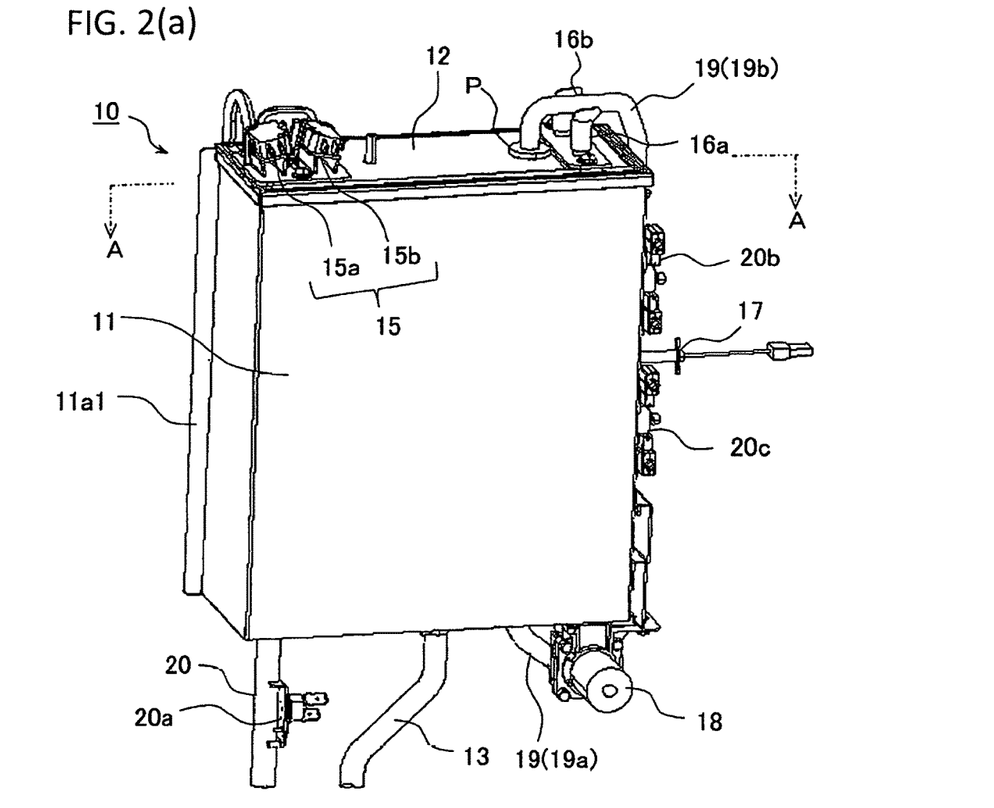
FIG. 2(a) is a perspective view seen obliquely from a right upper side.
Figure 2B:
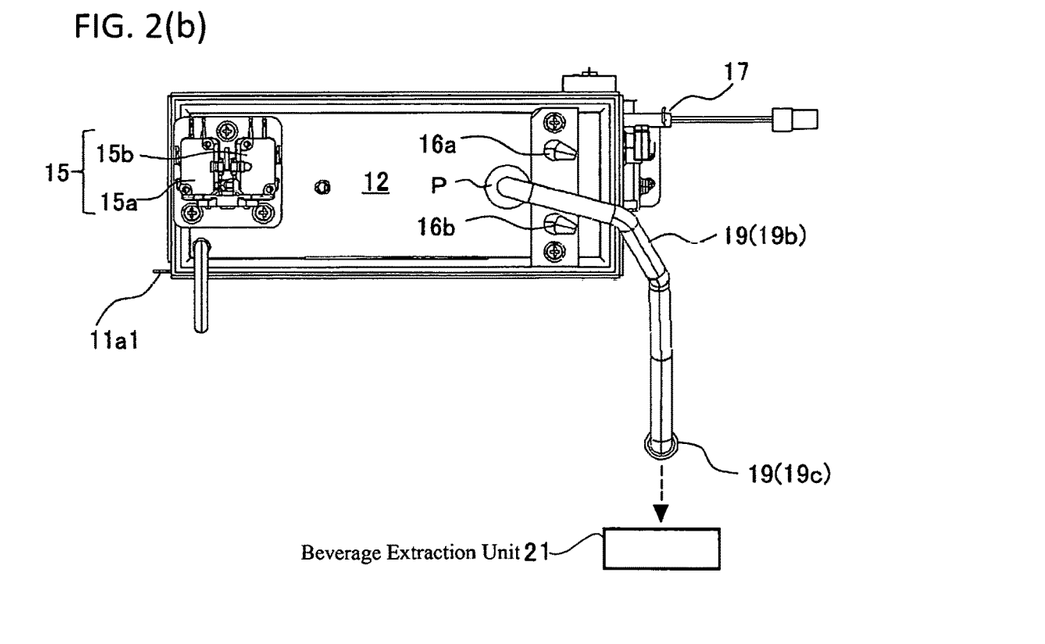
FIG. 2(b) is a plan view in FIG. 2(a)
Figure 3:
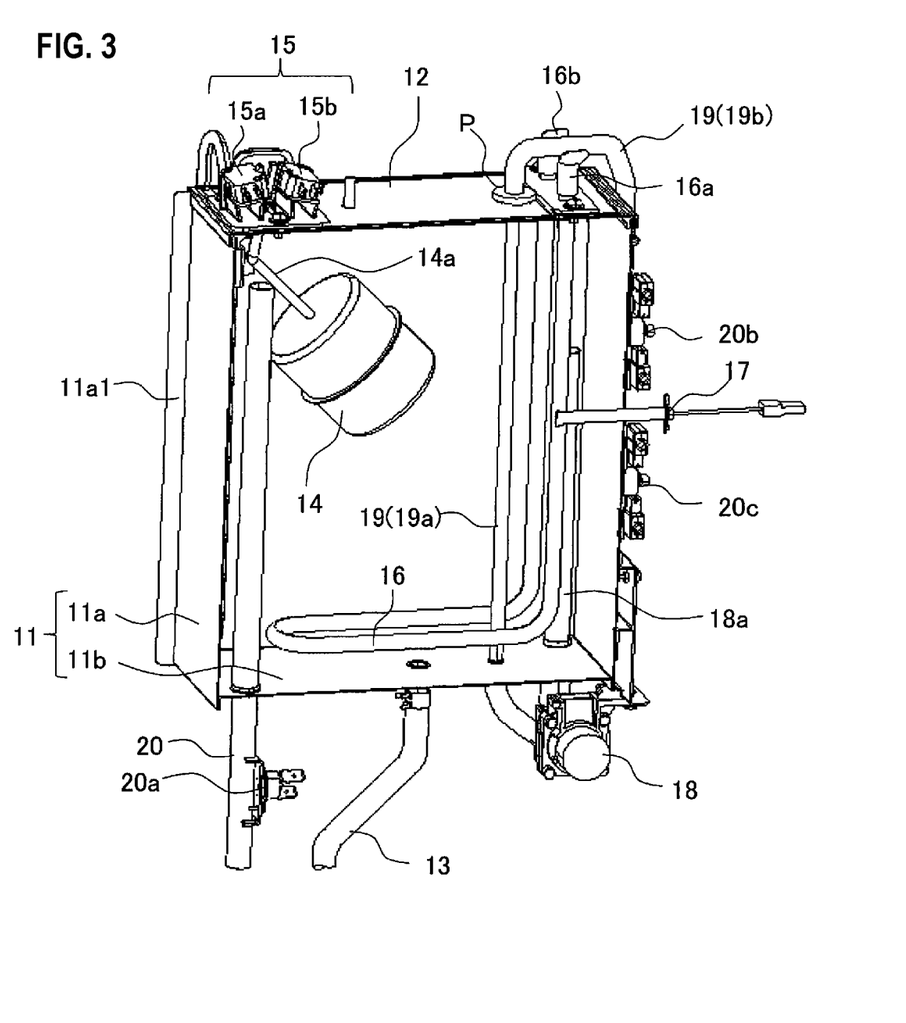
FIG. 3 is a cross-sectional perspective view taken along a line A-A of the hot-water tank in FIG. 2(a).

As shown in FIG. 1(a) with dotted lines, the hot-water tank 10 is disposed close to a rear side on a left end side in a front view of the cabinet 2, and the hot water stored in the hot-water tank 10 is supplied to the coffee brewer (beverage extraction unit) through a hot-water delivery piping 19 (see FIGS. 2(a) and 2(b), and FIG. 3) by driving a pump 18 (see FIGS. 2(a) and 2(b), and FIG. 3). Incidentally, on a right end side of the cabinet 2 in FIG. 1(a), there are disposed a tube-type pump which pressure-feeds a specified quantity of milk in a BIB (bag in box) housed inside a cooling box formed as a chamber having a heat-insulated structure; and a milk-containing beverage production unit which produces a liquiform steamed milk by mixing a cooled milk liquid concentrate pressure-fed by the tube-type pump and steam from a steam generating device, and produces a frothy milk foam by mixing air in addition to the cooled milk and the steam. The liquiform steamed milk and the frothy milk foam produced by the milk-containing beverage production unit are pipe-connected to supply to the beverage supply nozzle 7. Incidentally, as for a cooling device of the cooling box, there is used an electron cooling device using a Peltier effect.

Next, the hot-water tank 10 according to the present invention will be explained using FIGS. 2(a) and 2(b), and FIG. 3. FIGS. 2(a) and 2(b) show an overall structure of the hot-water tank 10, wherein FIG. 2(a) is a perspective view seen obliquely from a right upper side; and FIG. 2(b) is a plan view in FIG. 2(a). FIG. 3 is a cross-sectional perspective view taken along a line 3-3 of the hot-water tank 10 in FIG. 2(a).

In the drawings, the hot-water tank is shown again with the reference numeral 10, and the hot-water tank 10 comprises a tank main member 11 formed in a rectangular box shape opening an upper face to store the hot water; an upper lid 12 covering an upper face opening of the tank main member 11; a feed-water pipe 13 feeding drinking water into the tank main member 11; a float 14 moving up and down according to a water level fluctuation of the hot water stored inside the hot-water tank 10; a water-level detection switch 15 operating in association with an up-and-down movement of the float 14; a heater 16 heating the hot-water stored inside the hot-water tank 10; a temperature sensor 17 detecting a temperature of the hot water stored inside the hot-water tank 10; the pump 18 disposed below the hot-water tank 10; the hot-water delivery piping 19 piped to pass through the hot-water tank 10; a steam discharge pipe 20 discharging the steam inside the hot-water tank 10; and the like.

The tank main member 11 is formed by side wall members 11a (see FIG. 3) made of a steel plate to form side walls of the tank main member 11; and a bottom wall member 11b (see FIG. 3) made of a steel plate to form a bottom wall of the tank main member 11. The side wall members 11a are formed by one sheet of steel plate in an expanded case, and after one end portion of the one sheet of steel plate is bent to form a flange 11a1 (see FIGS. 2(a) and 2(b) as well), the one sheet of steel plate is bent in a rectangular shape to form the side walls, and then, a face of the flange 11a1 abuts against a face of the other end portion to be welded to form the side walls having the rectangular shape. The bottom wall member 11b is formed in a thin box shape wherein a peripheral edge of the steel plate is bent in the same direction. The bottom wall member 11b is determined in a size which fits into an opening on a lower portion side formed by the side wall members 11a, and in a condition wherein the box is turned over, after the bottom wall member 11b is fitted into the opening on the lower portion side formed by the side wall members 11a, the bottom wall member 11b is fixed by welding. Incidentally, a heat insulating material (not shown in the drawings) is provided around the tank main member 11.

The upper lid 12 is made of a steel plate; is detachably attached to the tank main member 11 while covering an opening on an upper portion side formed by the side wall members 11a of the tank main member 11; and is locked in the tank main member 11 by a locking device (not shown in the drawings) in a state of closing the aforementioned opening at a normal time.

The feed-water pipe 13 supplies the drinking water (tap water) from a bottom portion (the bottom wall member 11b of the tank main member 11) of the hot-water tank 10, and a release port which is one end of the feed-water pipe 13 is welded to the bottom wall member 11a of the tank main member 11, and the other end is connected to a water supply through a drinking water valve (not shown in the drawings), and when the drinking water valve is open, the drinking water is supplied into the hot-water tank 10 from the water supply.

The float 14 moves up and down according to a water level fluctuation of the hot water stored inside the hot-water tank 10, and is supported through a support rod 14a (see FIG. 3) axially supported in the upper lid 12 so as to freely sway. The support rod 14a is axially supported on an upper face of the upper lid so as to freely sway, and is formed such that one end is coupled with the float 14, and the other end sways in association with the up-and-down movement of the float 14.

The water-level detection switch 15 detects the water level fluctuation of the hot water inside the hot-water tank 10 by being operated by the other end of the support rod 14a, and is provided with an upper-limit water level switch 15a and a lower-limit water level switch 15b. The upper-limit water level switch 15a operates by being pressed by the other end of the support rod 14a swaying in association with a rise of the float 14 at a time completely filled with water. Also, the lower-limit water level switch 15b operates by being pressed by the other end of the support rod 14a swaying in association with a descent of the float 14 when a water level of the hot water stored inside the hot-water tank 10 is decreased, and a feed-water is required. Namely, the upper-limit water level switch 15a detects an upper-limit water level of a full water level of the hot water stored inside the hot-water tank 10, and the lower-limit water level switch 15b detects a lower-limit water level requiring the feed-water inside the hot-water tank 10, respectively.

The heater 16 is an electric heater (for example, a power consumption of 1000 W) arranged along the side wall and the bottom wall of the tank main member 11 and disposed inside the tank main member 11 double by being bent in a U-shape at the bottom wall, and connection terminals 16a and 16b connected to a commercial power supply are attached to the upper lid 12 by protruding from the upper face of the upper lid 12. The heater 16 is electrified so as to generate heat at a heating portion and heat the hot water stored inside the hot-water tank 10 at a specified temperature (for example, 98° C.)

The temperature sensor 17 detects the temperature of the hot water stored inside the hot-water tank 10, and is attached to the side wall member 11a of the tank main member 11. The temperature sensor 17 is used for controlling a power supply to the heater 16.

The pump 18 is disposed below the hot-water tank 10 to supply the hot water stored in the hot-water tank 10 upward, and a water-intake pipe 18a (see FIG. 3) inserted into the hot-water tank 10 by passing through the bottom wall member 11b of the hot-water tank 10 is pipe-connected to a water-intake port of the pump 18, and the hot-water delivery piping 19 is pipe-connected to a water-conveyance port of the pump 18. Also, in the pump 18, a check valve is not provided between the water-intake port and the water-conveyance port, and in a case wherein a propeller arranged between the water-intake port and the water-conveyance port rotates, the hot water moves toward the water-conveyance port from the water-intake port, and in a case wherein the propeller halts, the hot water can freely move between the water-intake port and the water-conveyance port.

The hot-water delivery piping 19 is pipe-connected to the water-conveyance port of the pump 18, and is arranged while passing through the hot-water tank 10. The hot-water delivery piping 19 passing through the hot-water tank 10 is disposed to pass between the double heater 16 disposed double by bending in the U-shape. The hot-water delivery piping 19 is formed by a water-pumping-up portion 19a pipe-connected to the water-conveyance port of the pump 18 and passing through the hot-water tank 10 to protrude above the upper lid 12; and a water-conveyance portion 19b connected to the water-pumping-up portion 19a and drawn around so that a hot-water discharge end 19c thereof sends the hot water to the coffee brewer (beverage extraction unit), and in a portion except for the portion passing through the hot-water tank 10, there is wound the heat insulating material. Here, a position of the hot-water discharge end 19c is higher than at least the bottom portion (bottom wall member 11b) of the hot-water tank 10. This is in order to prevent the hot water stored inside the hot-water tank from flowing out until it is gone, if the hot water is discharged from the hot-water discharge end 19c through the hot-water delivery piping 19 in a case wherein the position of the hot-water discharge end 19c is positioned lower than the bottom portion of the hot-water tank 10. Then, since the hot-water discharge end 19c is positioned higher than the bottom portion (bottom wall member 11b) of the hot-water tank 10, in a case of halting the pump 18, the hot water remaining inside the hot-water delivery piping 19 is pulled back into the hot-water tank 10 so that a water surface of the hot water inside the water-pumping-up portion 19a passing through the hot-water tank 10 comes to have a water level corresponding to a water surface inside the hot-water tank 10.

Incidentally, in a case wherein the position of the hot-water discharge end 19c is lower than the hot-water tank 10, a three-way joint having a T shape may be pipe-connected to the water-conveyance portion 19b so that the three-way joint is positioned higher than the upper-limit water level of the hot-water tank 10. In that case, when the pump 18 is halted, the air intrudes from the three-way joint into the hot-water delivery piping 19, so that the hot water remaining inside the hot-water delivery piping 19 is pulled back into the hot-water tank 10 so as to have the water level corresponding to the water surface inside the hot-water tank 10.

The steam discharge pipe 20 discharges the steam generated by boiling the hot water stored inside the hot-water tank 10, and is formed such that the steam discharge pipe 20 passes through the bottom wall member 11b of the hot-water tank 10 to be piped, and an upper end thereof is positioned at a position higher than the full water level of the hot water stored inside the hot-water tank 10. Also, the steam discharge pipe 20 has a function as an overflow pipe line of the hot water stored inside the hot-water tank 10 as well. Moreover, in a middle of the steam discharge pipe 20, there is provided a bimetal switch 20a. The bimetal switch 20a inverts to be "ON" when the temperature of the steam passing the steam discharge pipe 20 has a specified temperature (100° C.), and be "OFF" at a specified temperature or lower. The bimetal switch 20a is used for controlling the power supply to the heater 16, and provides a fail-safe function of forcibly cutting off the power supply to the heater 16 by the "ON" of the bimetal switch 20a. Incidentally, for the fail-safe function of the temperature sensor 17 carrying out a power-supply control of the heater 16, there are equipped bimetal switches 20b and 20c on the side wall (side wall member 11a of the tank main member 11) of the hot-water tank 10.

Here, the tank main member 11 of the hot-water tank 10 is separated by the side wall members 11a and the bottom wall member 11b in order to facilitate operations of welding the hot-water delivery piping 19 (water-pumping-up portion 19a), the water-intake pipe 18a, and the steam discharge pipe 20, which pass through the bottom wall member 11b, to the bottom wall member 11b, and an operation of welding the release port which is one end of the feed-water pipe 13 to the bottom wall member 11b. Namely, as a pre-process in a process assembling the bottom wall member 11b in the tank main member 11, the hot-water delivery piping 19 (water-pumping-up portion 19a), the water-intake pipe 18a, the steam discharge pipe 20, and the release port which is one end of the feed-water pipe 13 are welded to the bottom wall member 11b to be assembled as an assembly part, and then, the bottom wall member 11b is assembled in the tank main member 11. Thereby, operation efficiency for a difficult operation wherein the hot-water delivery piping 19 (water-pumping-up portion 19a), the water-intake pipe 18a, the steam discharge pipe 20, and the release port which is one end of the feed-water pipe 13 are welded to the bottom wall member 11b after the bottom wall member 11b is assembled in the tank main member 11 can be improved.

Incidentally, in the hot-water delivery piping 19, on the upper lid 12 wherein the water-pumping-up portion 19a passes through, which is pip-connected to the water-conveyance port of the pump 18, and piped while passing through the hot-water tank 10, there is drilled an opening (not shown in the drawings) having one size larger than a pipe diameter of the water-pumping-up portion 19a (hot-water delivery piping 19). Then, at a portion passing through the upper lid 12 in the water-pumping-up portion 19a, there are provided rubber packings P (in FIGS. 2(a) and 2(b), and FIG. 3, the packing P on the upper face is visible, and the packing P on a lower face is hidden by the upper lid 12 and invisible) so as to sandwich the upper lid 12 from upper and lower sides. The opening of the upper lid 12 through which the water-pumping-up portion 19a passes is formed one size larger than the pipe diameter of the water-pumping-up portion 19a (hot-water delivery piping 19), so that even in a case of generating a gap when the hot-water delivery piping 19 (water-pumping-up portion 19a) is welded to the bottom wall member 11b, the gap can be absorbed.

A water-level control maintaining the water level inside the hot-water tank 10 having the aforementioned structure in specified upper and lower allowable ranges, and the power-supply control of the heater 16 are controlled by a control portion (not shown in the drawings) by supplying a power source in the following manner. Namely, based on a signal (the upper-limit water level switch 15a is "OFF") from the water-level detection switch 15, the drinking water valve (an electromagnetic valve) connected to the feed-water pipe 13 is opened to supply the drinking water from the water supply into the hot-water tank 10. When the water level inside the hot-water tank 10 rises, and the upper-limit water level switch 15a is turned "ON", the drinking water valve (electromagnetic valve) connected to the feed-water pipe 13 is closed to stop the supply of water into the hot-water tank 10. After that, the power-supply control to the heater 16 is carried out, and the drinking water stored inside the hot-water tank 10 is heated to a specified temperature (for example, 90° C.) The power supply to the heater 16 is controlled based on a signal from the temperature sensor 17, and when the temperature sensor 17 detects that the drinking water stored inside the hot-water tank 10 has reached to the hot water having the specified temperature, the power supply of the heater 16 is cut off. Then, the water level of the hot water stored inside the hot-water tank 10 declines by driving the later-described pump 18, and when the lower-limit water level switch 15b is turned "ON", the drinking water valve (electromagnetic valve) connected to the feed-water pipe 13 is opened to supply the drinking water from the water supply into the hot-water tank 10 and maintain the water level of the hot water stored inside the hot-water tank 10 in the water level in the specified upper and lower allowable ranges. Incidentally, the power-supply control to the heater 16 includes a control preventing overheat by the heater 16 by forcibly cutting off the power supply when the bimetal switches 20a to 20c operate. Moreover, the power supply to the heater 16 can be forcibly cut off by a signal of the lower-limit water level switch 15b as well.

In the beverage supply device 1 shown in FIGS. 1(*a*) and 1(*b*) wherein the hot-water tank 10 having the aforementioned structure is mounted, in a case wherein the regular coffee beverage is desired, as shown in FIG. 1(*b*), after the cover 3a is opened to place a cup on the cup rest 8 below the beverage supply nozzle 6, the cover 3a is closed, and then the beverage selection button 4 displayed as the regular coffee beverage is pushed. When the regular coffee beverage is selected by an operation of the beverage selection button 4, the beverage supply device 1 provides a specified quantity of coffee beans from the canister 2a wherein the roasted coffee beans are housed to the mill through the bean chute. The mill in which the coffee beans are provided crushes the coffee beans into the ground beans having the specified particle size by the crushing blade, and then, supplies to the coffee brewer. Simultaneously, the hot water stored inside the hot-water tank 10 is supplied to the coffee brewer in the following manner.

Namely, the pump 18 disposed below the hot-water tank 10 is driven only for a predetermined specified time. When the pump 18 is driven, the hot water inside the water-pumping-up portion 19a passing through the hot-water tank 10 in the hot-water delivery piping 19 is discharged from the hot-water discharge end 19c to the coffee brewer through the water-conveyance portion 19b. Thereby, the coffee brewer soaks the ground beans crushed by the mill in the hot water to prepare (extract) the regular coffee beverage. The regular coffee beverage prepared (extracted) by the coffee brewer is supplied to the cup placed on the cup rest 8 through the beverage supply nozzle 6.

Here, the hot water discharged to the coffee brewer by driving the pump 18 becomes the hot water inside the water-pumping-up portion 19a passing through the hot-water tank 10 in the hot-water delivery piping 19; however, the water-pumping-up portion 19a passing through the hot-water tank 10 in the hot-water delivery piping 19 is soaked in the hot water stored inside the hot-water tank 10 to be kept warm. Therefore, the temperature of the hot water inside the water-pumping-up portion 19a passing through the hot-water tank 10 comes to have an approximately same temperature as that of the hot water stored inside the hot-water tank 10, and the temperature of the hot water inside the water-pumping-up portion 19a can be maintained at a proper temperature by the power-supply control of the heater 16. Also, the hot water accumulated in the pump 18 is heated at the proper temperature required for extracting the coffee beverage as well by passing the water-pumping-up portion 19a passing through the hot-water tank 10 to be discharged.

Moreover, the driving of the pump 18 is stopped, so that the hot water remaining in the water-conveyance portion 19b of the hot-water delivery piping 19 is pulled back into the hot-water tank 10 until the water surface (water level) inside the water-pumping-up portion 19a passing through the hot-water tank 10 in the hot-water delivery piping 19 comes to have the water level corresponding to the water surface inside the hot-water tank 10 by Pascal's principle. Therefore, during a stand-by time after the beverage prepared (extracted) using the hot water stored in the hot-water tank 10 is provided, the hot water remaining inside the hot-water delivery piping 19 is kept warm by the hot water stored inside the hot-water tank 10, so that the hot water does not get cold, and there is no possibility of propagation of bacteria.

Incidentally, in a case wherein a milk-containing beverage (for example, cafe latte) is desired, as shown in FIG. 1(*b*), after the cover 3a of the beverage supply device 1 is opened to place a cup on the cup rest 8 below the beverage supply nozzle 6, the cover 3a is closed, and then the beverage selection button 4 of the regular coffee beverage is pushed, and the regular coffee beverage is waited to be poured. After the supply of the regular coffee beverage into the cup is confirmed, the cover 3a is opened, and the cup containing the regular coffee beverage is re-placed on the cup rest 8 below the beverage supply nozzle 7. Then, after the cover 3a is closed, when the beverage selection button 4 of the desired milk-containing beverage is pushed, the liquiform steamed milk and the frothy milk foam produced by the milk-containing beverage production unit (not shown in the drawings) are poured into the cup from the beverage supply nozzle 7, so that after the supply of the milk-containing beverage from the beverage supply nozzle 7 is confirmed, the cover 3a may be opened to take out the cup.

As described above, according to the beverage supply device according to the embodiment, the beverage supply device 1 has the hot-water tank 10 storing the hot water heated by the built-in heater 16 to provide the prepared beverage using the hot water stored in the hot-water tank 10 as needed, and comprises the hot-water delivery piping 19 guiding the hot water pumped up by the pump 18 disposed below the hot-water tank 10 and stored in the hot-water tank 10 to the beverage extraction unit. The hot-water delivery piping 19 is arranged to pass through the hot-water tank 10 so as to control the pump 18 by selecting the beverage by a beverage selection device (the beverage selection button 4), and during the stand-by time after the hot water stored in the hot-water tank 10 is discharged to the beverage extraction unit through the hot-water delivery piping 19, the water surface of the hot water remaining in the hot-water delivery piping 19 is returned up to the water level of the hot water stored in the hot-water tank 10, and the hot water remaining in the hot-water delivery piping 19 is kept warm at the temperature of the hot water inside the hot-water tank 10 by the hot water inside the hot-water tank 10, so that the hot water having the proper temperature can be delivered to the beverage extraction unit even at a time of the next beverage supply. Also, there is an effect that there is no possibility that the hot water remaining in the hot-water delivery piping 19 becomes cold and generates bacteria.

Incidentally, in the aforementioned embodiment, as for the beverage extraction unit, the beverage extraction unit extracting the regular coffee beverage has been explained; however, the beverage extraction unit can also be applied to a tea extraction unit extracting a tea leaf component by soaking in the hot water to generate a tea beverage, and the like. Therefore, the present invention is not limited to the beverage supply device 1 of the embodiment of the present invention.

The disclosure of Japanese Patent Application No. 2015-155232, filed on Aug. 5, 2015, is incorporated in the application.

While the invention has been explained with reference to the specific embodiments of the invention, the explanation is illustrative and the invention is limited only by the appended claims.

What is claimed is:

1. A beverage supply device comprising:
a hot-water tank,
a feed-water pipe feeding drinking water to the hot-water tank,
a built-in heater disposed in the hot-water tank and heating the drinking water fed through the feed-water pipe to make hot water in the hot water tank for a beverage,
a pump arranged below the hot-water tank, and
a hot-water delivery piping partially stored in the hot-water tank, and including
a water-pump-up portion connected to the pump and disposed inside the hot-water tank to take the hot water in the tank, and
a water-conveyance portion connected to the water-pump-up portion and located outside the hot-water tank, the water-conveyance portion having a hot-water discharge end located above a bottom part of the hot-water tank, to thereby guide the hot water stored in the hot-water tank pumped by the pump to a beverage extraction unit,
wherein the water-pump-up portion passes through the hot-water tank and is soaked in the hot water stored inside the hot-water tank such that a temperature of the hot water inside the water-pump-up portion passing through the hot-water tank is same temperature as a temperature of the hot water stored inside the hot-water tank.

2. A beverage supply device according to claim 1, wherein the water-pump-up portion passing through the hot-water tank is disposed adjacent to the heater.

3. A beverage supply device comprising:
a hot-water tank,
a feed-water pipe feeding drinking water to the hot-water tank,
a built-in heater disposed in the hot-water tank and heating the drinking water fed through the feed-water pipe to make hot water in the hot water tank for a beverage,
a pump arranged below the hot-water tank, and
a hot-water delivery piping partially stored in the hot-water tank, and including
a water-pump-up portion connected to the pump and disposed inside the hot-water tank to take the hot water in the tank, and
a water-conveyance portion connected to the water-pump-up portion and located outside the hot-water tank, the water-conveyance portion having a hot-water discharge end located above a bottom part of the hot-water tank, to thereby guide the hot water stored in the hot-water tank pumped by the pump to a beverage extraction unit,
wherein the water-pump-up portion passes through the hot-water tank and is soaked in the hot water stored inside the hot-water tank such that a temperature of the hot water inside the water-pump-up portion passing through the hot-water tank is same temperature as a temperature of the hot water stored inside the hot-water tank,
the water-pump-up portion passing through the hot-water tank is disposed adjacent to the heater,
the heater is disposed inside the hot-water tank along a side wall and a bottom wall of the hot-water tank and bent in a U-shape at the bottom wall inside the hot-water tank, and
the water-pump-up portion passes through a space formed in the U-shape.

4. A beverage supply device according to claim 1, wherein the feed-water pipe is connected to the bottom part of the hot-water tank.

5. A beverage supply device according to claim 1, wherein the hot-water delivery piping further includes a water-intake pipe disposed inside the hot-water tank and connected to the water-pump-up portion through the pump to take the hot water inside the hot-water tank.

* * * * *

UNITED STATES PATENT AND TRADEMARK OFFICE
CERTIFICATE OF CORRECTION

PATENT NO. : 10,568,456 B2  
APPLICATION NO. : 15/205522  
DATED : February 25, 2020  
INVENTOR(S) : Yoshika Tanida It is certified that error appears in the above-identified patent and that said Letters Patent is hereby corrected as shown below:

In the Specification

Please change Column 6, Line 32, from "… upper lid so …" to --… upper lid 12 so …--.

Please change Column 7, Line 37, from "… hot-water tank from …" to --… hot-water tank 10 from …--.

Signed and Sealed this
Fifteenth Day of September, 2020

Andrei Iancu
*Director of the United States Patent and Trademark Office*